(No Model.) 2 Sheets—Sheet 1.
E. WITT.
AUTOMATIC APPARATUS FOR MEASURING AND REGISTERING GRAIN.
No. 345,353. Patented July 13, 1886.
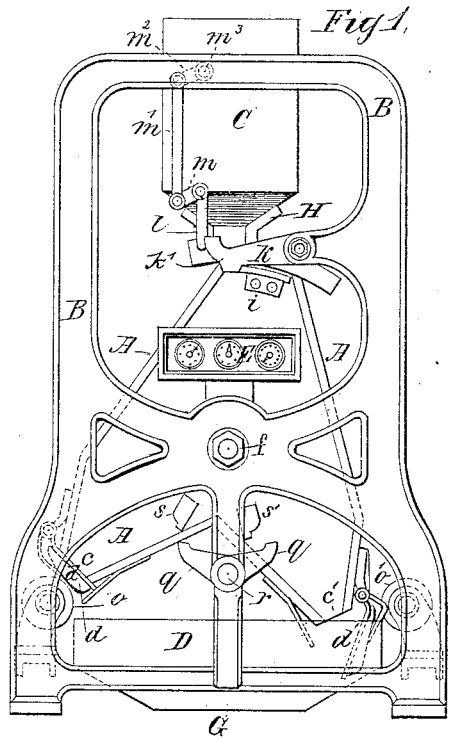
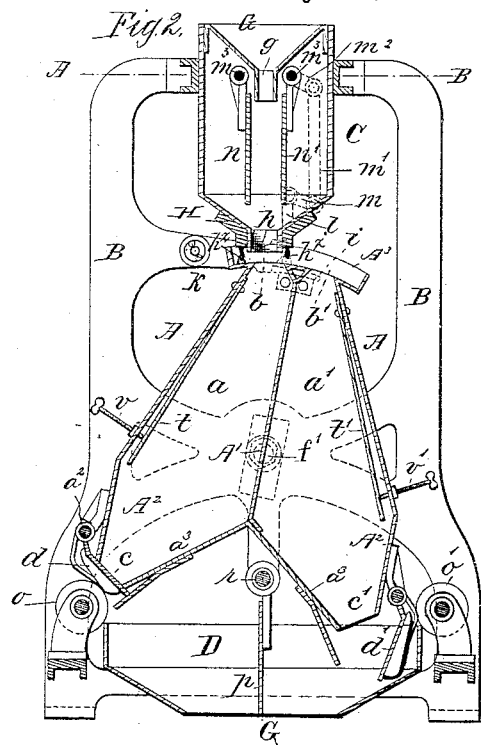
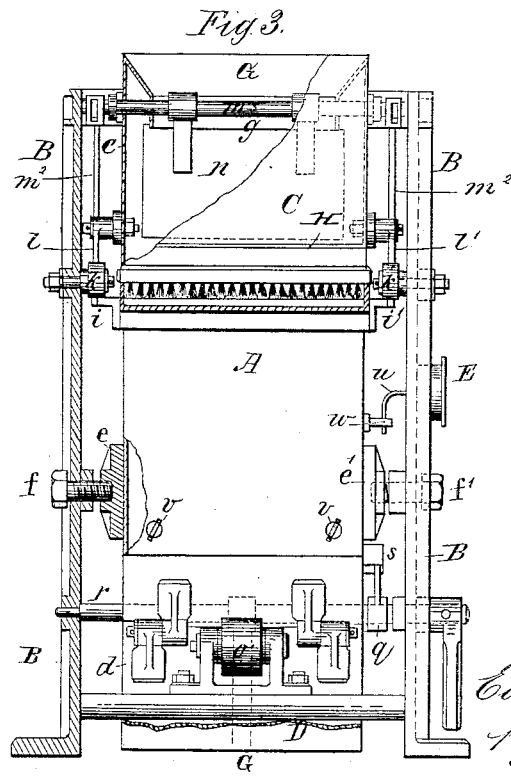
Witnesses
Inventor
Edward Witt (No Model.) 2 Sheets—Sheet 2.
E. WITT.
AUTOMATIC APPARATUS FOR MEASURING AND REGISTERING GRAIN.
No. 345,353. Patented July 13, 1886.
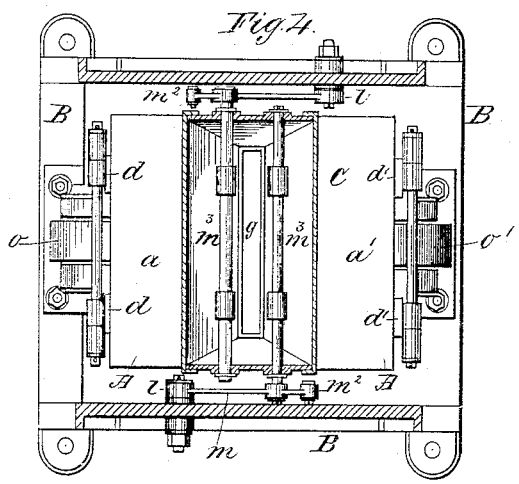
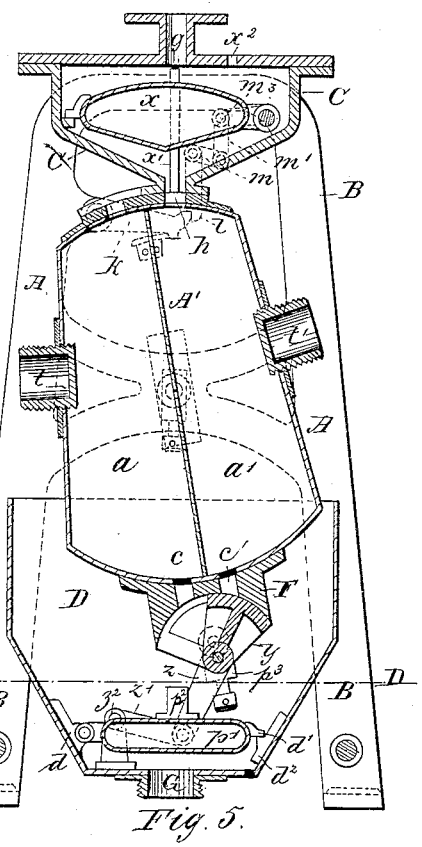
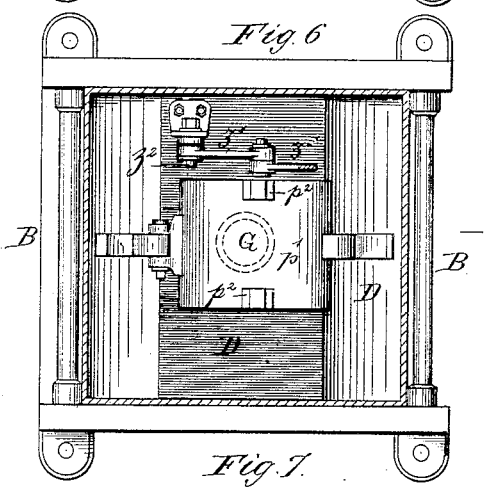
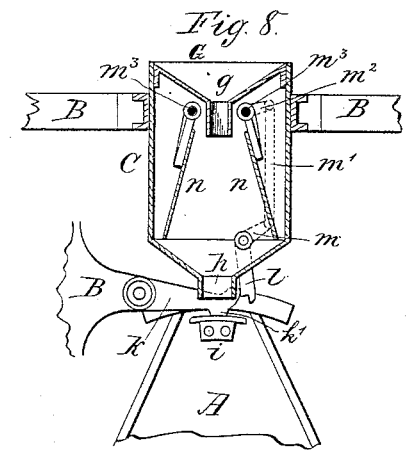
Witnesses
G. W. Knotts
W. E. Coulter
Inventor
Eduard Witt
pr Henry Ooth
his att'y

UNITED STATES PATENT OFFICE.

EDUARD WITT, OF AACHEN, GERMANY.

AUTOMATIC APPARATUS FOR MEASURING AND REGISTERING GRAIN.

SPECIFICATION forming part of Letters Patent No. 345,353, dated July 13, 1886.

Application filed March 21, 1884. Serial No. 125,089. (No model.) Patented in Germany December 24, 1883, No. 27,587; in France January 15, 1884, No. 159,736; in Belgium February 8, 1884, No. 64,093; in England February 14, 1884, No. 3,291; in Spain February 26, 1884, No. 5,666; in Italy February 27, 1884, No. 16,510; in Portugal April 17, 1884, No. 909, and in Austria April 22, 1884, No. 17,627.

*To all whom it may concern:*

Be it known that I, EDUARD WITT, a citizen of the German Empire, residing at Aachen, in Germany, have invented an Improved Automatic Apparatus for Measuring and Registering, (for which I have obtained Letters Patent in England, No. 3,291, dated February 14, 1884; in France, No. 159,736, dated January 15, 1884; in Belgium, No. 64,093, dated February 8, 1884; in Germany, No. 27,587, dated December 24, 1883; in Austria, No. 17,627, dated April 22, 1884; in Italy, No. 16,510, dated February 27, 1884; in Spain, No. 5,666, dated February 26, 1884, and in Portugal, No. 909, dated April 17, 1884,) of which the following is a full, clear, and exact description.

This invention relates to an apparatus for automatically measuring dry granular substances—such as corn, seeds, cereals of all kinds, small coal, and so forth—as well as all kinds of liquids, and automatically to register the quantities so measured.

In the accompanying drawings, Figure 1 shows a front view of a grain-measuring apparatus; Fig. 2, a vertical section, and Fig. 3 a side elevation, partly in section, of the same. Fig. 4 is a horizontal section on line A B of Fig. 2. Fig. 5 shows by a vertical section a modified construction of the apparaus adapted for measuring liquids. Fig. 6 is a section on line C D of Fig. 5; and Figs. 7 and 8 show by an elevation and section, respectively, a portion of the apparatus illustrated in Figs. 1 to 4, inclusive.

The operation of my improved apparatus is based upon the principle of gravity of solids or liquids acting upon a pivoted measuring-vessel; and the invention consists, essentially, in the construction, arrangement, and co-operation of parts whereby the desired results are obtained, and in the mechanical details whereby the operation of the apparatus is made automatic, substantially as hereinafter fully described, and as specifically pointed out in the claims.

In the above-described drawings, B indicates the frame, of suitable construction, to support the operating mechanism by which the measurement of solids or liquids is effected, said frame being provided with suitable bearings, $f$ and $f'$, in which are mounted the short axles or journals $e$ and $e'$ of the measuring-vessel A, and in which bearings said vessel is free to oscillate under certain conditions, presently to be described. The vessel A has substantially the form of a truncated cone, and is divided into two measuring-chambers, $a$ and $a'$, respectively, by a central diaphragm or partition, A'. As shown in Figs. 1 and 2, the lower portion of the vessel A has its lateral faces inclined inwardly, as at $a^2$, while its bottom is formed by a re-entrant angle, the sides $a^3$ of which incline outwardly toward the faces $a^2$, thus forming two discharge-spouts, $A^2 A^2$, one for each chamber $a$ and $a'$, having discharge-openings $c$ and $c'$. To each of the inwardly-inclined faces $a^2$ is pivoted a gravity-valve, $d$ and $d'$, adapted to close the discharge-openings $c$ and $c'$, respectively, or to automatically open the same, as the vessel A oscillates on its pivots. The closing of the discharge-valves is effected by rollers $o$ and $o'$, pivoted to the frame B of the apparatus, with which the valves contact, and are closed when the vessel A has reached the limit of its oscillatory movement, as shown in Fig. 1. In its normal position the vertical axis of the vessel does not lie in a vertical plane, but in a plane at an angle to said vertical plane, so that one of its inlet-ports will always lie below and register with the discharge-opening of the feed-hopper, and so as to allow the material fed to one or the other measuring-chamber to act upon the vessel A by gravity and oscillate the same. This normal position of vessel A is plainly shown in Fig. 1, and is reversed when the weight of the material in chamber $a$ causes the said vessel to oscillate, as will be readily understood.

In the upper end of the vessel, and registering with the chambers $a$ and $a'$, are formed the inlet or feed ports $b$ and $b'$, and around said upper end is formed a flange or projection, $A^3$, to prevent the material fed to the vessel from spilling.

H is a feed-spout secured to the frame B, the lateral faces of which are provided with brushes $h^x$, whereby the grain or other material that may lie in the throat of vessel A, formed by the projecting flange A³, is automatically swept into the chambers $a$ or $a'$, as said vessel oscillates in one or the other direction.

C is the feed-hopper, also secured to frame B, its spout $h$ fitting into the throat of the feed-spout H. Within the upper portion of hopper C is secured a second hopper, G, the throat $g$ of which is considerably smaller than the throat $h$ of hopper C. By the described construction I obtain a feed-hopper, the inlet-opening $g$ of which is considerably smaller than the outlet-opening $h$, to prevent the choking of the hopper by the material fed thereto, or its overflow, which would be liable to occur during the oscillations of the vessel, if the inlet-opening were as large or larger than the outlet-opening of the said feed-hopper. This choking or overflow is, however, effectually prevented by the described construction. It is obvious, therefore, that the material will be discharged from the hopper C as fast as it is fed thereto, and, in fact, faster, so that no accumulation of material can take place in said hopper so long as the chamber to which the material is fed is not full.

It is obvious that the measuring-vessel A should be rigidly locked in position during the filling of one or the other compartments, and in order to make the operation of the apparatus an automatic one it is further necessary that means should be provided to release the measuring-vessel after one or the other compartment is full. To effect this automatic release of the vessel, I utilize the weight of the material itself, in fact I utilize the weight of what may be called the "overflow" of the material or an excess of material above that required to fill the measuring-chamber, and in the following manner: The feed-hopper C is of such a capacity as to contain a certain quantity of grain or other material to be measured. In the upper portion of the hopper, and on opposite sides of the inlet-opening $g$, are arranged two rock-shafts, $m^3$, to each of which is secured a diaphragm or partition, $n$, that extends practically over the full length of the hopper. The distance between the partitions is equal to the width of the discharge-opening $h$, and the grain is thereby guided to said opening as it issues from the smaller inlet-opening, $g$. These partitions or diaphragms serve to release the vessel A when full, and the releasing and locking devices are arranged on opposite sides of the apparatus—that is to say, there is a locking device on opposite sides of the apparatus, and the said device on one side of the apparatus is operated by mechanism connected to one end of one of the shafts $m^3$, while the locking device on the opposite side of the apparatus is operated by mechanism connected to the corresponding end of the other shaft $m^3$, and, as both are constructed and operate alike, it will be sufficient to describe one of them.

To the vessel A is secured a catch, $i$, consisting of a bracket, with the projecting ledge of which engages the nose $k'$ on the under side of a locking-pawl, $k$, that is pivoted to the frame B, by means of which pawl and catch $i$ the vessel is locked into proper position under the feed-hopper, the contacting-surfaces of the pawl and catch or ledge being beveled to facilitate their engagement. With the upwardly-projecting nose $k^2$ of pawl $k$ engages a latch, $l$, that is pivoted to a link, $m$, which latter is pivoted to one end of a rod, $m'$. The rod $m'$ is pivoted to a link, $m^2$, which latter is rigidly secured to the end of shaft $m^3$, which end projects outwardly from hopper C.

As shown in Fig. 1, the parts are in the position they assume when the vessel A is locked against oscillation, the chamber $a$ thereof receiving the material, as shown in Fig. 2. When the chamber $a$, however, is full, the grain will accumulate in the hopper, and the diaphragms $n$ will be pressed outwardly toward the sides of the hopper, thereby rotating or rocking the shaft $m^3$. This partial rotation of the shaft $m^3$ lifts the rod $m'$, whose upward movement disengages latch $l$ from the nose $k^2$ of pawl $k$. The weight of the vessel disengages the pawl from the bracket or stop $i$, and said vessel is free to oscillate, as shown in Figs. 7 and 8. In its oscillation from left to right the valve $d$ of the filled chamber $a$ rides off the roller $o$ and drops by gravity to uncover the discharge-opening $c$ of said chamber, from which the grain is now fully discharged. When the vessel A has reached the limit of its oscillatory movement, the inlet-opening $b'$ of chamber $a'$ will lie under the discharge-opening $h$ of hopper C, the pawl $k$ will be in the proper position to be locked by the latch $l$ as soon as the grain in hopper C has run out, the partitions or diaphragms $n$ assuming their normal positions, with the latch in engagement with the pawl, thus locking the vessel against operation until chamber $a'$ is filled, when it is again released, as described, and so on continuously. Each oscillation of the vessel is registered by means of a pin, $w$, impinging upon a crank-arm, $u$, that operates the main driving-arbor of any suitable registering apparatus, E, and as the latter apparatus and the mode of operating the same are too well known I have deemed it unnecessary to describe the same in detail.

To increase the range of the apparatus, and adapt the same for measuring various quantities, I have provided means whereby the capacity of the measuring-chambers may be varied. To this end I provide adjustable diaphragms or partitions $t$, pivoted within the measuring-chambers at their upper end and extending downward to the discharge-spouts, as shown in Fig. 2. These diaphragms are adjusted toward or from the central partition, A', by means of adjusting-screws $v$, Figs. 2 and 3. It is obvious that the closer these partitions are brought toward the central partition the greater will be the reduction of the capacity of the measuring-chambers. The grain or other material measured is discharged into a hopper, D, and thence into any suitable receptacle.

To prevent the hopper from becoming choked by an accumulation of the material discharged into it from the measuring-chambers, I employ the following devices: Below the measuring-vessel A is arranged a rock-shaft, $r$, that has its bearings in the frame B of the apparatus, and to said shaft is secured a diaphragm or partition, $p$, and a two-armed detent or stop-lever, $q$, adapted to engage stops $s\ s$, secured to the measuring-vessel A. As shown in Fig. 2, the partition $p$ divides the hopper D into two equal discharge spouts or compartments, one for each measuring-chamber of the vessel A. Should any accumulation of material take place in one or the other compartment of the hopper D, the partition $p$ will be pushed or forced to one side, thereby oscillating the shaft $r$, and with it the stop-lever $q$, one of the arms of which will thus be moved into the path of one of the stops $s$ on vessel A, and arrest its movement until the accumulated material has passed out of the hopper chamber or compartment in which the accumulation occurs, the partition $p$ moving back into its normal position as soon as the pressure exerted thereon by the material in the hopper ceases, and the lever $q$ will be disengaged from the stop $s$ to allow the vessel A to complete its oscillatory movement.

By very slight modifications in the arrangement and construction of the operating devices the apparatus may be employed for measuring liquids, such modification being shown in Fig. 5. In this construction the vessel A is released from the stopping devices $l$ $k$ by means of a float, $x$, arranged in hopper C, said float being in this case connected with the rock-shaft $m^3$, the operation being substantially the same as above described. It is obvious that so long as the float $x$ is in the position required to hold the latch $l$ in engagement with the pawl $k$ the vessel A will be held against oscillation, but when said float, by an accumulation of liquid in hopper C, is caused to rise it will rock or oscillate the shaft $m^3$, and lift the latch $l$ out of engagement with the pawl $k$, thereby releasing the vessel, as above described.

In measuring liquids a discharge-valve should be employed that will form a tight joint on its seat to prevent leakage, and the gravity-valve above described would therefore not answer the purpose. To avoid this leakage, I employ a slide-valve, $y$, of sector or segmental form, secured to a rocking or oscillating valve-spindle that has its bearings in the valve-casing F, secured to the bottom of the vessel A, the latter being provided with corresponding valve-ports, $c\ c'$, that communicate with the measuring-chambers $a$ and $a'$, respectively, the valve-casing being provided with suitable ports and valve-seats. The bottom of vessel A is made concave, to insure the discharge of the contents of the measuring-chambers, said valve-ports being formed at the point of greatest depression of the bottom on opposite sides of the central partition or diaphragm, A', of vessel A. The valve $y$ is here also controlled by the movements of the measuring-vessel A by means of a rock-lever, $z$, pivoted to a lever, $z'$, fulcrumed on a stud or pin, $z^2$, secured to a bracket bolted to the bottom of the discharge-hopper D. It will be readily understood that when the vessel A swings from the position shown in Fig. 5 to the opposite side or left the levers $z\ z'$ will tilt the valve $y$ from port $c'$ to port $c$.

To prevent any accumulation of liquid within the discharge-hopper, the oscillating wing or partition is replaced by a float, $p'$, to which are secured stops $p^2$, adapted to engage suitable lugs, $p^3$, secured to and projecting from the valve-casing F. The float $p'$ is hinged to a bracket, $d$, secured within the hopper, and has a nose, $d'$, that bears upon a rest, $d^2$. As long as the liquid is freely discharged from hopper D, the float will remain in the position shown in Fig. 5; but should the liquid accumulate in the hopper the float will rise, and its stops $p^2$ will be brought into the path of the lugs $p^3$, that project downwardly from the valve-casing F, thereby arresting the movement of vessel A, and preventing the levers $z\ z'$ from actuating the valve. As the accumulated liquid is discharged, the float falls until it again reaches a position to release the vessel A by the disengagement of the stops $p^2$ from those $p^3$, as will be readily understood.

The adjustment of the capacity of the measuring-chambers is here effected by means of screw-caps $t$, instead of the wings or partitions above described, as it is obvious that with a liquid such wings would not have the desired effect; but by introducing into the chambers a body that will take the place of a given volume of the contents thereof the capacity may be varied and adjusted. These screw-caps $t$ are screwed into the side walls of the vessel A, and may be adjusted to displace or take the place of a greater or less volume of liquid therein.

It is obvious that the changes in the construction and arrangement of certain devices whereby the apparatus is adapted for measuring liquids are simply the equivalents of those described in relation to the apparatus adapted for measuring solids, their operation being precisely the same, and do not in the least change the nature of the invention.

I am aware that oscillating measuring vessels or chambers are not broadly new. Such have heretofore been used in liquid-meters and analogous apparatus, and I do not desire to claim such a vessel, broadly; but What I do claim is—

1. In a measuring apparatus, an oscillating measuring-vessel divided into two chambers having a feed-port and a valved discharge-port, and the combination therewith of a feed and discharge hopper common to both chambers, and movable partitions arranged in said hoppers, controlled by the material therein, and operating to control the feed of said material to and its discharge from said chambers, as described.

2. In a measuring apparatus, an oscillating measuring-vessel divided into two chambers, the capacity of which is made adjustable, having a feed-port and valved discharge-port, and the combination therewith of a feed and discharge hopper common to both chambers, and movable partitions arranged in said hoppers controlled by the material therein, and operating to control the feed of said material to and its discharge from said chambers, as described.

3. In a measuring apparatus, an oscillating measuring-vessel, in combination with a feed-hopper and locking devices to lock the vessel to the hopper, said locking devices being controlled by the accumulation of the material within the hopper after the vessel has been filled, as described.

4. In a measuring apparatus, an oscillating measuring-vessel, in combination with a feed-hopper, the capacity whereof is adjustable, and locking devices to lock the vessel to the hopper, controlled by the variations in the capacity of the latter, as described.

5. In a measuring apparatus, an oscillating measuring-vessel, in combination with a discharge-hopper, the capacity whereof is adjustable, and a stop for arresting the oscillatory movement of the vessel controlled by the variations in the capacity of the discharge-hopper, as described.

6. In a measuring apparatus, an oscillating measuring-vessel provided with a valved discharge-port and a hopper for receiving the material discharged through said port, in combination with a movable partition arranged in and controlled by the material in the hopper, and controlling the operation of the valve of said discharge-port, substantially as and for the purpose specified.

7. The combination, with the vessel A and its flanged receiving-trough $A^3$, of a stationary feed-spout provided with brushes $h^x$, as and for the purpose specified.

In testimony whereof I have hereto put my hand in the presence of two subscribing witnesses.

EDUARD WITT.

Witnesses:
   E. BOETTCHER,
   MARILLIER.